United States Patent [19]

Minotti

[11] Patent Number: 4,909,189

[45] Date of Patent: Mar. 20, 1990

[54] ILLUMINATED COLLAR

[76] Inventor: Peter L. Minotti, R.D. #1, Box 75, Easton, Pa. 18042

[21] Appl. No.: 308,103

[22] Filed: Feb. 8, 1989

[51] Int. Cl.⁴ ............................................. A01K 27/00
[52] U.S. Cl. .................................... 119/106; 119/109
[58] Field of Search ........................ 119/96, 106, 109

[56] References Cited

U.S. PATENT DOCUMENTS 3,871,336  3/1975  Bergman .............................. 119/106
4,173,201 11/1979  Chao et al. ........................... 119/106
4,513,692  4/1985  Kuhnsman et al. .................. 119/109

Primary Examiner—Paul J. Hirsch
Attorney, Agent, or Firm—John Lezdey

[57] ABSTRACT

An illuminated collar for pets includes a self-fastening strip of material which includes illumination means, reflective stripping or light bulbs for making the animal more noticable at night. The collar includes means for attaching to another animal collar and is powered by an encased battery pack.

6 Claims, 1 Drawing Sheet

ILLUMINATED COLLAR

BACKGROUND OF THE INVENTION

1. Field of the Invention

This invention relates to collars, and more particularly to a selectively illuminated collar for pets.

2. Desrption of the Prior Art

Pet owners use a variety of devices and apparatus to identify and to control their pets. Common among these devices are collars of many styles. Although it is desirable to have pets under the personal control of the owners at all times, often pets wander on their own. When a pet is out at night, it is often difficult to keep track of the pet or to find it, especially if it is some distance away. Therefore, it is desirable to have a means to quickly locate an animal in the dark or at dusk.

Prior art collars have utilized merely reflecting means to identify the pet and prevent injury by automobiles at night. However, reflection usually occurs when the automobile is so close that the driver may not have time to react. Also, reflection requires that the pet already be within the light so that the driver cannot anticipate a pet suddenly running into the path of the automobile.

SUMMARY OF THE DISCLOSURE

The aforementioned problem is obviated by the illuminated collar of this invention. An illuminated animal collar uses a a battery pack that powers one or more lights on a collar strip. The lights may be blinking or steady burning. The light source and battery pack may be integral with the collar or be added to a conventional collar. Alternatively, a miniature photo-electric switch which automatically activates the lights at darkness replaces the manual switch.

Preferably, the light source comprises a plurality of light bulbs wired in series. However, the light source may comprise a flexible fiber optic strip which is associated with a single light emitting means. A high intensity bulb has been found to be suitable. All of the bulbs may be encased in a protective cover which, preferably, is impervious to moisture.

Advantageously, the light is used in combination with reflecting materials and/or illuminescent materials.

It is, therefore, an object of this invention to provide a pet collar with illumination means for making the pet more noticable at night.

It is another object of this invention to provide a collar with illumination which is selectively operated.

It is still another object of this invention to provide means for converting a conventional pet collar into an illuminated or reflective collar with greater visibility.

These and other objects will be more readily ascertainable to one skilled in the art from a consideration of the following figures, description and exemplary embodiments, with the understanding that the drawings are illustrative only and that changes may be made in the specific construction illustrated and described within the scope of the appended claims.

BRIEF DESCRIPTION OF THE DRAWING(S)

DETAILED DESCRIPTION OF THE PREFERRED EMBODIMENT(S)

Figure 1:
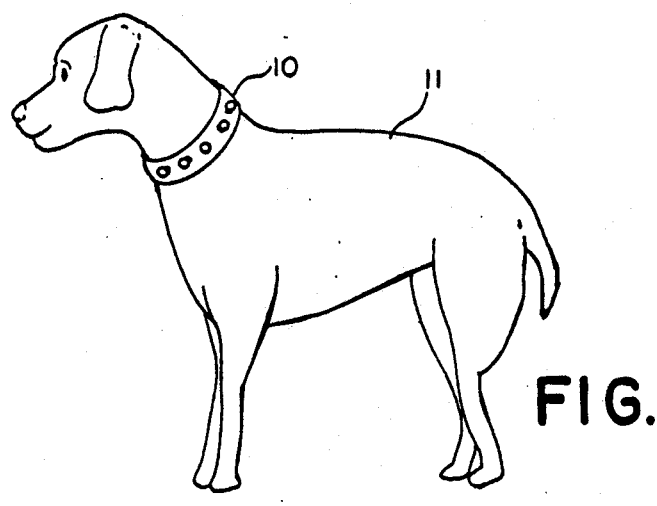
FIG. 1 is a perspective view showing a pet wearing the illuminated collar of this invention.
Figure 2:
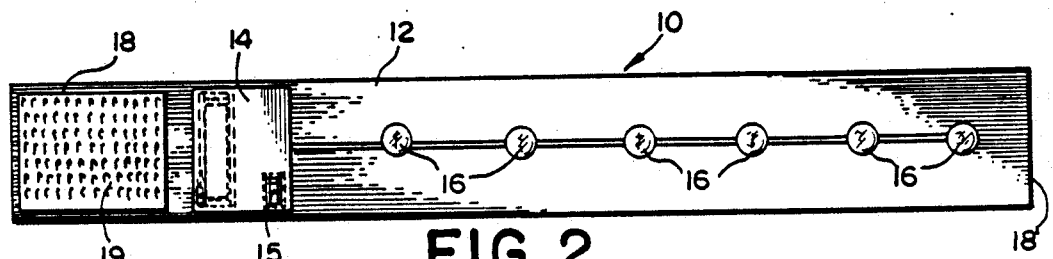
FIG. 2 is top view of the collar of this invention.

Referring now to the drawings, and more particularly to FIGS. 1 and 2, the illuminated animal collar 10 of this invention is shown opened flat (FIG. 2), and fastened around the neck of a dog 11 (FIG. 1). Collar 10 is formed from strip 12, which is preferably fabric, vinyl, nylon, leather or other durable fabric, and includes self fastening means at each strip end 18 and 18' (visible only on end 18 and on the reverse of end 18'). Although belt-type buckles or snaps are possible, self fastening loops 19 such as Velcro are preferred for both ease of use and adjustability. Light bulbs 16 are attached to strip 12 and wired in series. Lights 16 may burn steadily or blink, as is common with Christmas tree lights. The bulbs may also be high intensity bulbs, in which case it is possible that only one bulb would be used. The bulbs receive electric power from battery pack 14 and are activated by switch 15. Switch 15 is either manually operated by the pet owner at his discretion, or it is a miniature photo-electric cell which automatically activates the lights at darkness. Battery pack 14, also attached to strip 12, is encased in vinyl or other water impervious material. The light bulbs themselves are also preferably encased in moisture-proof protective covers. Collar 10 is fastened around the neck of the animal and the user activates the collar with switch 15 each time the animal is released or walked at night. The collar may remain on the animal at all times (especially when the switch is a photo-electric), or it may be removed and only used when necessary.

Figure 3:
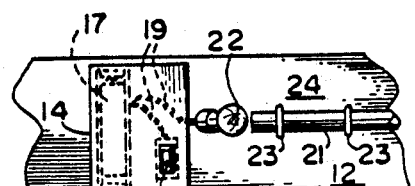
FIG. 3 is a partial enlargement showing the battery pack and altenative light source and fiber optic cord.
Figure 4:
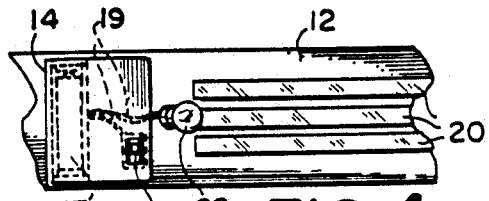
FIG. 4 is a partial enlargement showing the battery pack, high intensity light and reflective patches on the strip.

Now referring to FIGS. 3 and 4, alternative embodiments are shown in enlargement. Strip 12 has battery pack 14 which includes battery 17, connecting wires 19, switch 15, and high intensity light bulb 22. In the embodiment illustrated in FIG. 3, fiber optic cord 21 is attached by clips 23 along the length of side 24 of the strip 12 and shines when light is supplied by bulb 22. In the embodiment shown in FIG. 4, increased visibility is provided by reflective patches 20 which are fastened, preferably by adhesive, to side 24 of strip 12 and reflect the light from bulb 22. Reflective patches 20 and fiber optic cord 21 are used alone or in combination with each other or with the embodiment shown in FIGS. 1 and 2.

Figure 5:
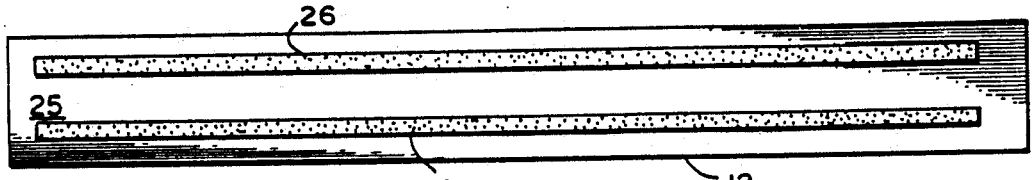
FIG. 5 illustrates the reverse side of the strip with adhesive means for attaching the strip to another animal collar.

In the alternative embodiment shown in FIG. 5, reverse side 25 of strip 12 may be fastened to another collar instead of being fastened by itself around the animal's neck. In this embodiment, strip 12 is provided with fastening means on the side opposite the light emitting side. Reverse side 25 of strip 12 is shown having adehsive 22 applied along its length. Thus, strip 12 is attached to another animal collar, converting a conventional collar into the illuminated one of this invention.

An illuminated animal collar 10 includes a strip 12 of material with fastening means 19 and at least one light source 16 attached to side 24 of strip 12. A power pack 14 includes battery 17 and switch means 15 for selectively illuminating the collar. There is either a plurality of low wattage electric bulbs 16 or a single high intensity bulb 20. Light is reflected from reflective strips 20 or fiber optic cord 21, which is held to strip 12 by clips 23. The material strip 12 is optionally luminescent or strips 20 are luminescent. Adhesive is placed on the reverse side 25 of strip 12 to provide for fastening of strip 12 to another animal collar.

Having now illustrated and described my invention, it is not intended that such description limit this invention, but rather that this invention be limited only by reasonable interpretation of the appended claims.

What is claimed is:

1. An illuminated collar attachment comprising:
a strip of fabric having self fastening means;
fiber optic cord means disposed along a length of said fabric strip, said fiber optic cord means receiving emitted light from a light source and displaying said light onto said collar; and,
means to selectively energize said light source.

2. The illuminated collar attachment according to claim 1, wherein said optic cord means is held to said fabric strip with clips.

3. The illuminated collar attachment according to claim 1 further comprising a plurality of loops along the length of said fabric strip, said optic cord means threaded through said loops.

4. The illuminated collar attachment according to claim 1 wherein said light source is a high intensity light bulb.

5. The illuminated collar attachment according to claim 1, wherein said means to selectively operate said light source comprises switch means.

6. The illuminated collar attachment according to claim 5 wherein said switch means comprises a miniature photo-electric switch.

* * * * *